Patented Sept. 27, 1927.

1,643,496

UNITED STATES PATENT OFFICE.

WILLY O. HERRMANN, HANS DEUTSCH, AND WOLFRAM HAEHNEL, OF MUNICH, GERMANY, ASSIGNORS TO CONSORTIUM FÜR ELEKTROCHEMISCHE INDUSTRIE G. M. B. H., OF MUNICH, BAVARIA, GERMANY.

METHOD OF IMPROVING ALDEHYDE RESINS.

No Drawing. Application filed July 26, 1923, Serial No. 654,029, and in Germany July 8, 1922.

Our invention relates to a process for the improvement of aldehyde resins and is characterized by adding to non-phenolic aldehyde resins organic hydroxy-acids such as dihydroxystearic acid, ricinoleic acid, dihydroxyabietic acid, salicylic acid and the like. Instead of the hydroxy-acids themselves their derivatives or mixtures with other compounds may be used for example castor oil. By the addition of an organic hydroxy-acid compound the resins get a better elasticity, solubility and fusibility and sometimes a lighter colour.

It is known that in the manufacture of artificial resins by condensing formaldehyde with phenolic compounds the reaction is sometimes carried out in the presence of organic hydroxy-acid compounds but the process according to our invention does not relate to phenolic resins at all.

In carrying out the invention the resins are melted and the organic hydroxy-acid compound is added to the melted resin. The resins before being melted may be subjected to a refining process or an oxidizing treatment. The organic hydroxy-acid compound may also be added in any stage of the process of production of the resins e. g. in the beginning of the reaction or during the reaction.

Sometimes it is advantageous to carry out the invention under a pressure higher than the atmospheric one or in the presence of an organic solvent for the reaction-products, that is the organic hydroxy acid is added to the solution of the aldehyde resin and the solvent evaporated off.

The products obtained according to the invention may be subjected to a purification process e. g. by treating them with water or an aqueous acid solution in a ball mill or by dissolving them in an organic solvent and precipitating them from the solution by adding water. They may also be heated in the molten state for a longer time in order to improve their hardness, or they may be esterified since they contain —OH and —COOH groups. Finally they may be hardened by melting them with oxides of metals or their salts with weak acids to form resinates.

The products obtained according to our invention are used for the manufacture of lacquers, varnishes, polishing and insulating means and the like.

Example 1.

The resinous product obtained by condensing 500 parts of acetaldehyde with 300 parts of a 20 per cent caustic soda solution is melted with 30 per cent of its weight of ricinoleic acid and kept in the molten state at 150° C. for a short time. Then it is rolled out in a rolling apparatus to shellac-like sheets. The product obtained shows a greater elasticity and a lighter colour than the resin started from and is very useful instead of shellac for the manufacture of varnishes and polishes and the like.

Example 2.

A resin, obtained by the condensation and polymerization of 1000 parts of acetaldehyde with 550 parts of normal caustic soda solution at a temperature of 70° C. and after being heated at 120° C. for some hours is ground for two hours in a porcelain ball mill with an aqueous solution of acetic acid of 3 per cent strength. A fine suspension of the swelled resin particles is obtained. The resin is separated by filtering and melted at about 200°. To 100 parts of the molten product 30 parts of castor oil and two parts of aluminium oxide are added. The product thus obtained is more elastic, harder and lighter than a resin produced in the same manner but without addition of castor oil.

Example 3.

100 parts of a resin, produced by heating crotonic aldehyde in an autoclave for a long time, are melted with 75 parts of castor oil. A product with a melting point of about 60° C. is obtained. When slightly warmed, it is very ductile and may be used instead of wax.

Example 4.

1000 parts of acetaldehyde are condensed with 550 parts of a normal caustic soda solution at a temperature of 70° C. to 120° C. The resin resulting is dissolved in glacial acetic acid and this solution is subjected to an oxidizing process. The resin thereafter precipitated from this solution is not sufficiently fusible. By incorporating 50 parts of castor oil with 100 parts of this resin by melting the fusibility of the resin is increased.

*Example 5.*

100 parts of acetaldehyde are allowed to flow into 100 parts of a normal caustic soda solution, while stirring and cooling. After having added the acetaldehyde the reaction vessel is heated until a tough resin is formed, and salicylic acid is mixed to the reaction product in the proportion of 25 parts of salicylic acid to 100 parts of resin. The reaction product is heated for some time, then the volatile compounds are distilled off and the resin, remaining in the vessel, is heated up to 150° C. The resin obtained after cooling is ground in a porcelain ball mill for two hours with an acetic acid of three per cent strength. Hereafter the resin is separated from the liquid, washed and heated for some hours at about 200° and finally brought into the form of shellac-like sheets by rolling apparatus. The resin obtained is more elastic, better fusible, better soluble in alcohol and of a lighter colour than a product produced in the same manner but without addition of salicylic acid.

*Example 6.*

30 parts of castor oil are saponified with 75 parts of a double normal caustic soda solution and 100 parts of acetaldehyde are allowed to flow in while well stirring and cooling. The reaction product is heated for five hours on the reflux condenser. After distilling off the volatile products the resin remaining in the vessel is heated at 150° C. The product is isolated as described in Example 5. The resin obtained is more elastic, better fusible, better soluble in alcohol and of a lighter colour than a product produced under the same conditions but without addition of castor oil.

*Example 7.*

To a solution of 30 parts of dihydroxystearic acid and 80 parts of a double normal caustic soda solution, 100 parts of crotonaldehyde are added. The reaction is carried out as described in Example 5 and a product is obtained with the qualities of the product according to Example 5.

*Example 8.*

100 parts of butyric aldehyde are allowed to flow into an autoclave which contains a mixture of 15 parts of a ten normal caustic soda solution, 300 parts of alcohol and 30 parts of castor oil, while well stirring. After heating for some hours at 180° C. the alcohol is distilled off and the resin remaining in the vessel is treated, as described in Example 5. By the addition of the hydroxy-acid the elasticity, solubility, fusibility and colour of the resin has been improved in a high degree.

What we claim is:

1. Process for the improvement of aldehyde resins consisting in incorporating organic hydroxy-carboxylic acid compounds into non-phenolic aldehyde resins.

2. Process for the improvement of aldehyde resins consisting in melting non-phenolic aldehyde resins with organic hydroxy-carboxylic-acid compounds.

3. Process for the improvement of aldehyde resins consisting in adding aliphatic hydroxy-carboxylic-acid compounds to aldehyde resins, this addition being carried out in any stage of the process of production of the aldehyde resins.

4. Process for the improvement of aldehyde resins consisting in adding organic hydroxy-carboxylic acid compounds to aldehyde resins, this addition being carried out by incorporating the hydroxy-carboxylic acid with a solution of the resin, evaporating the solvent, and melting the remaining mixture of the resin and the hydroxy-carboxylic acid.

5. Process for the improvement of aldehyde resins consisting in adding organic hydroxy-carboxylic acid compounds to aldehyde resins, this addition being carried out in any stage of the process of production of the aldehyde resins by incorporating the hydroxy-carboxylic-acid with a solution of the resin, evaporating the solvent, and melting the remaining mixture of the resin and the hydroxy-carboxylic-acid.

6. Process for the improvement of aldehyde resins consisting in melting non-phenolic aldehyde resins with organic hydroxy-carboxylic-acid compounds under a pressure higher than the atmospheric one.

7. Process for the improvement of aldehyde resins consisting in adding aliphatic hydroxy-carboxylic-acid compounds to aldehyde resins, this addition being carried out in any stage of the process of production of the aldehyde resins and subjecting the product obtained to an intensive washing process.

8. Process for the improvement of aldehyde resins consisting in melting non-phenolic aldehyde resins with organic hydroxy-carboxylic-acid compounds and subjecting the product obtained to a longer thermal treatment by heating it in the molten state.

9. Process for the improvement of aldehyde resins consisting in adding aliphatic hydroxy-carboxylic-acid compounds to aldehyde resins, this addition being carried out in any stage of the process of production of the aldehyde resins, and subjecting the product obtained to a longer thermal treatment by heating it in the molten state.

10. Process for the improvement of aldehyde resins consisting in melting non-phenolic aldehyde resins with organic hydroxy-carboxylic-acid compounds and esterifying the product obtained.

11. Process for the improvement of aldehyde resins consisting in adding aliphatic hydroxy-carboxylic-acid compounds to aldehyde resins, this addition being carried out in any stage of the process of production of the aldehyde resins and esterifying the product obtained.

In testimony whereof we have hereunto set our hands.

Dr. WILLY O. HERRMANN.
Dr. HANS DEUTSCH.
Dr. WOLFRAM HAEHNEL.